United States Patent
Tangudu et al.

(10) Patent No.: US 10,873,239 B2
(45) Date of Patent: Dec. 22, 2020

(54) ELECTRIC MACHINE COOLING FEATURES

(71) Applicant: Hamilton Sundstrand Corporation, Charlotte, NC (US)

(72) Inventors: Jagadeesh Kumar Tangudu, South Windsor, CT (US); Thomas M. Yun, Glastonbury, CT (US); John A. Sharon, West Hartford, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 181 days.

(21) Appl. No.: 16/125,001

(22) Filed: Sep. 7, 2018

(65) Prior Publication Data

US 2020/0083783 A1   Mar. 12, 2020

(51) Int. Cl.
*H02K 9/22* (2006.01)
*H02K 5/18* (2006.01)
*H02K 1/12* (2006.01)
*H02K 3/02* (2006.01)
(Continued)

(52) U.S. Cl.
CPC ............. *H02K 5/18* (2013.01); *H02K 1/12* (2013.01); *H02K 3/02* (2013.01); *H02K 3/46* (2013.01);
(Continued)

(58) Field of Classification Search
CPC ............ H02K 9/22; H02K 1/22; H02K 15/02; H02K 15/14; H02K 5/18; H02K 3/02; H02K 3/46; H02K 5/20; H02K 9/00; H02K 9/005; H02K 9/02; H02K 9/04; H02K 9/06; H02K 9/08; H02K 9/10; H02K 9/12; H02K 9/14; H02K 9/16; H02K 9/18; H02K 9/19;
(Continued)

(56) References Cited

U.S. PATENT DOCUMENTS

| 4,913,337 A | 4/1990 | Gotoh |
| 9,755,463 B2 | 9/2017 | Klassen et al. |

(Continued)

FOREIGN PATENT DOCUMENTS

| CN | 108140746 A | 6/2018 |
| EP | 3076526 B1 | 9/2018 |

(Continued)

OTHER PUBLICATIONS

European Patent Office, Extended European Search Report, Application No. 19194149.1-1201, dated Dec. 10, 2019 (8 pp.).

*Primary Examiner* — Quyen P Leung
*Assistant Examiner* — Alexander A Singh
(74) *Attorney, Agent, or Firm* — Cantor Colburn LLP

(57) ABSTRACT

Disclosed is a stator having: a first member having a first plurality of axially opposing ends including a first front end and a first back end mutually spaced along a first stator center axis, a first outer diameter (OD) side and a first inner diameter (ID) side, wherein first member comprises laminated steel; a plurality of cooling features disposed directly against the first member, wherein the plurality of fins spans between the first plurality of axially opposing ends of the first member, and wherein: the stator comprises a base layer disposed directly against the first member, between the first member and the cooling features, thereby reducing an interface contact resistance between the first member and the plurality of cooling features.

8 Claims, 7 Drawing Sheets

(51) Int. Cl.
*H02K 3/46* (2006.01)
*H02K 15/02* (2006.01)
*H02K 15/14* (2006.01)

(52) U.S. Cl.
CPC ............... *H02K 9/22* (2013.01); *H02K 15/02* (2013.01); *H02K 15/14* (2013.01)

(58) Field of Classification Search
CPC .......... H02K 9/193; H02K 9/197; H02K 9/20; H02K 9/24; H02K 9/26; H02K 9/28; H02K 1/12
USPC ..... 310/52, 53, 54, 55, 58, 59, 60 R, 62, 63, 310/60 A, 64
See application file for complete search history.

(56) References Cited

U.S. PATENT DOCUMENTS

| | | | | |
|---|---|---|---|---|
| 2005/0127771 | A1* | 6/2005 | Gerfast | ................... H02K 21/16 310/158 |
| 2015/0197858 | A1* | 7/2015 | Corbeil | .................... C23C 4/01 427/448 |
| 2016/0099617 | A1* | 4/2016 | Kohler | .................... H02K 1/20 310/216.052 |
| 2016/0294231 | A1 | 10/2016 | Andres et al. | |
| 2016/0352201 | A1 | 12/2016 | Ranjan et al. | |
| 2016/0365755 | A1 | 12/2016 | Long et al. | |
| 2018/0174098 | A1 | 6/2018 | Andres et al. | |
| 2018/0200823 | A1 | 7/2018 | Huang et al. | |
| 2018/0205284 | A1 | 7/2018 | Huang et al. | |
| 2018/0205285 | A1 | 7/2018 | Huang et al. | |
| 2018/0205298 | A1 | 7/2018 | Huang et al. | |
| 2018/0205299 | A1 | 7/2018 | Huang et al. | |

FOREIGN PATENT DOCUMENTS

| | | | |
|---|---|---|---|
| FR | 3063403 | A1 | 8/2018 |
| JP | 57-34747 | A | 2/1982 |
| JP | 58-222753 | A | 12/1983 |
| JP | 59-220054 | A | 12/1984 |
| JP | 2014-50133 | A | 3/2014 |
| WO | WO-2016096042 | A1 * | 6/2016 ............... H02K 5/18 |

* cited by examiner

ELECTRIC MACHINE COOLING FEATURES

BACKGROUND

Exemplary embodiments pertain to the art of motor components and more specifically to motor cooling features mounted to a motor to provide reduced thermal resistance between the cooling features and the motor.

An electric machine generates heat due to many causes including electromagnetic losses both in copper windings and in laminated steel cores. One approach to dissipate such heat is to provide a metal sleeve that is place around the stator. Natural or forced convection can then carry the heat away.

One way to improve convection is to provide a sleeve that includes pins or plate fins. Such a sleeve is typically formed by machining aluminum such that it includes the pins or plate fins. The sleeve is then slid over the outer diameter of the stator. The sleeve can then be shrink fit to form a tight connection to the stator.

However, the limiting factor of this design is the contact resistance between the aluminum of and the steel of the stator. Further, asperities on the surface of the stator preclude the shrink fit from creating an interface with intimate contact lowering the efficacy by which heat can transfer into the aluminum.

BRIEF DESCRIPTION

Disclosed is a stator comprising: a first member having a first plurality of axially opposing ends including a first front end and a first back end mutually spaced along a first stator center axis, a first outer diameter (OD) side and a first inner diameter (ID) side, wherein first member comprises laminated steel; a plurality of cooling features disposed directly against the first member, wherein the plurality of fins spans between the first plurality of axially opposing ends of the first member, and wherein: the stator comprises a base layer disposed directly against the first member, between the first member and the cooling features, thereby reducing an interface contact resistance between the first member and the plurality of cooling features.

In addition to one or more of the above disclosed features or as an alternate the plurality of cooling features is one or more of (i) a plurality of discrete fins and (ii) a plurality of continuous fins.

In addition to one or more of the above disclosed features or as an alternate the plurality of cooling features has a cross section that is one or more of rectangular, oval, arcuate, and circular.

In addition to one or more of the above disclosed features or as an alternate the plurality of cooling features have a cross section that is one or more of a discrete elliptical cross section and a discrete circular cross section.

In addition to one or more of the above disclosed features or as an alternate the plurality of cooling features form an axially continuous waveform.

In addition to one or more of the above disclosed features or as an alternate the plurality of cooling features are disposed directly against and extend radially outwardly from the base layer.

In addition to one or more of the above disclosed features or as an alternate the stator includes a support frame supporting the opposing axial ends of the first member.

In addition to one or more of the above disclosed features or as an alternate the support frame comprises a second member surrounding the first member between the first plurality of axially opposing ends, the second member including a plurality of perforations, wherein the plurality of cooling features is additively manufactured onto the stator through the respective plurality of perforations, and wherein a shape of the perforations defines a cross sectional shape of the respective cooling features for at least a portion of a span of the respective cooling features.

In addition to one or more of the above disclosed features or as an alternate the support frame comprises a plurality of support rings, including a front end support ring supporting the first front of the first member and a back end support ring supporting the first back end of the first member, the plurality of cooling features being disposed axially between the plurality of support rings.

Further disclosed is a motor including a stator having one or more of the above disclosed features, and in addition thereto or as an as an alternate the motor includes copper windings disposed on the first ID side of the first member, and a rotor disposed within the stator. Further disclosed is a method of configuring a stator, comprising: providing a first member, the member comprising a first plurality of axially opposing ends including a first front end and a first back end, a first outer diameter (OD) side and a first inner diameter (ID) side, wherein first member comprises steel; hot forming a plurality of cooling features directly against and extending radially outwardly from the first member, wherein the plurality of cooling features spans between the first plurality of axially opposing ends of the first member; and layering, by cold spraying deposition, the base layer directly against the first OD side of the first member, thereby reducing an interface contact resistance between the first member and the plurality of cooling features. In addition the stator includes one or more of the above disclosed features. Further disclosed is a method of configuring a motor, the method including: configuring a stator according to a method disclosed hereinabove, disposing copper windings on the first ID side of the first member of the stator, and disposing a rotor within the stator.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
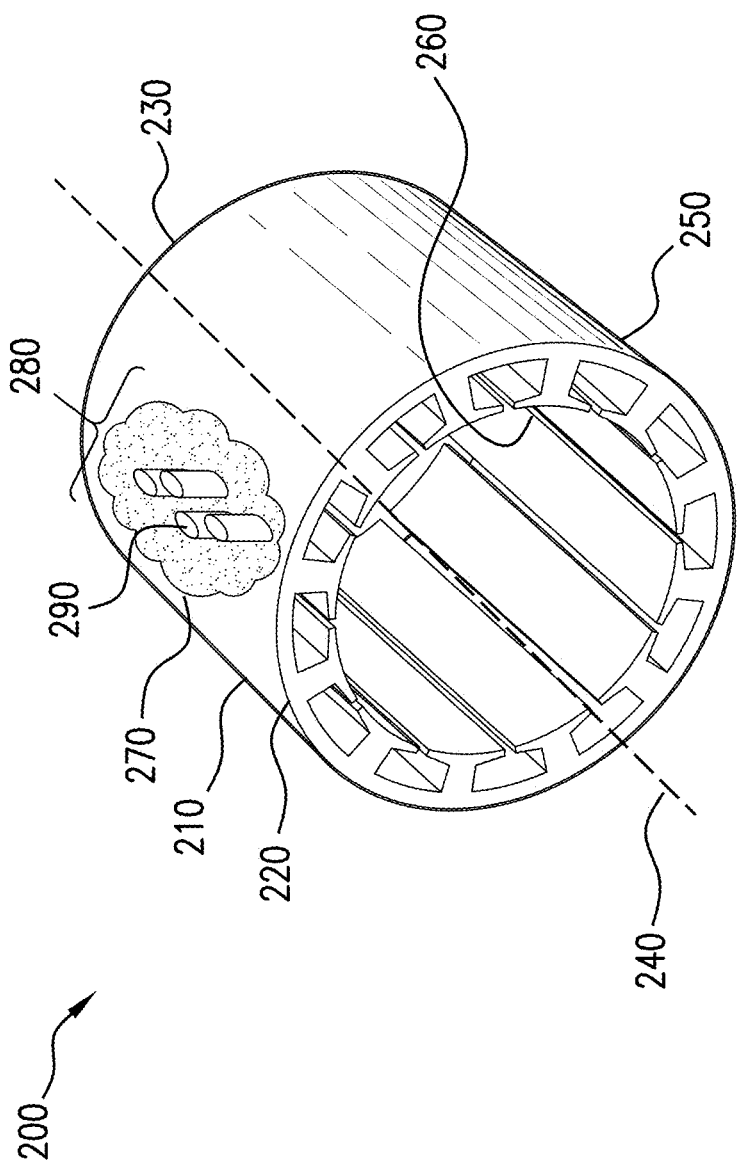
FIG. 1 illustrates features of a stator according to an embodiment.

Turning to FIG. 1, disclosed is a stator 200 comprising a first cylindrical member 210 that may have a first plurality of axially opposing ends including a first front end 220 and a first back end 230 mutually spaced along a first stator center axis 240. The first member 210 may have a first outer diameter (OD) side 250 and a first inner diameter (ID) side 260. In addition, the first member 210 can be formed of material such as laminated electrical steel.

In one embodiment, a base layer 270, a portion of which is illustrated schematically in FIG. 1, may be disposed directly against the first OD side 250 of the first member 210. This base layer 270 can be formed of material that is different than the material forming the first member 210. In one embodiment, the base layer 270 is formed of material, such as, aluminum or an aluminum alloy, copper, diamond, carbon composites etc.

A plurality of cooling features 280, including a first fin 290, may be disposed directly against and extend radially outwardly from the first member 210. In one embodiment that is configured with the base layer 270, the cooling features 280 may be disposed directly against and extend radially outwardly from the base layer 270. It is to be appreciated that only a few of the plurality of fins 280 are illustrated in FIG. 1. In one embodiment, the plurality of fins 280 spans between the first plurality of axially opposing ends 220, 230 of the first member 210. The plurality of fins 280 may be formed of a different material than the first member 210 and the same material as the base layer 270.

According to an embodiment, the base layer and/or plurality of cooling features 280 may be additively manufactured onto the stator 200 by an appropriate technique, such as, wire arc additive manufacturing and/or direct energy deposition and/or powder deposition and/or cold spray, and/or electron beam etc. With this configuration thermal contact resistance will be improved (lowered) compared with other electrical machine interfaces manufactured by shrink-fit, press-fit, assembly etc.

Figure 2:
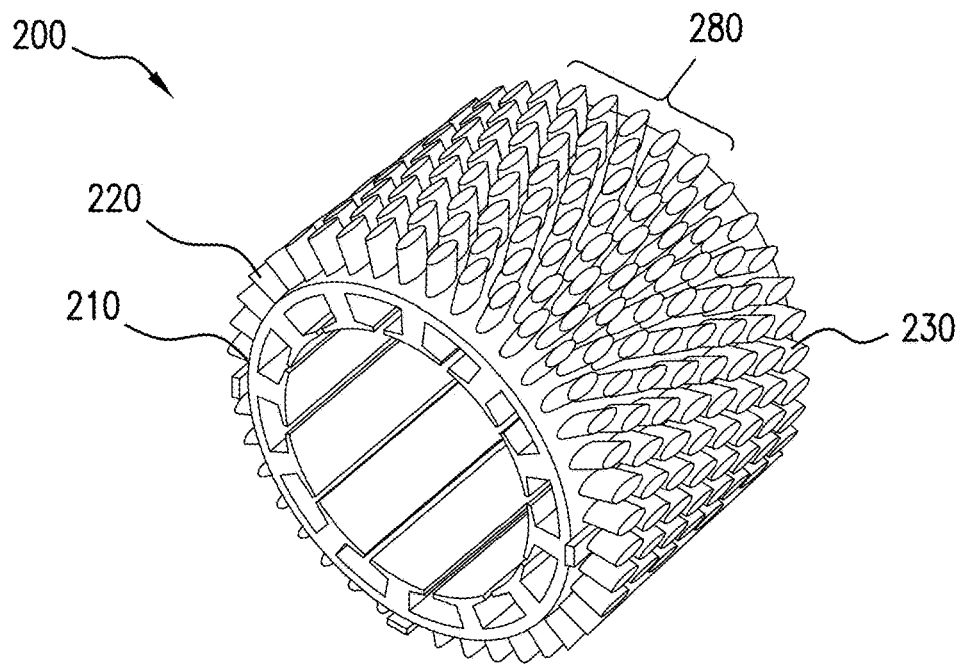
FIG. 2 illustrates additional features of a stator according to an embodiment.
Figure 3:
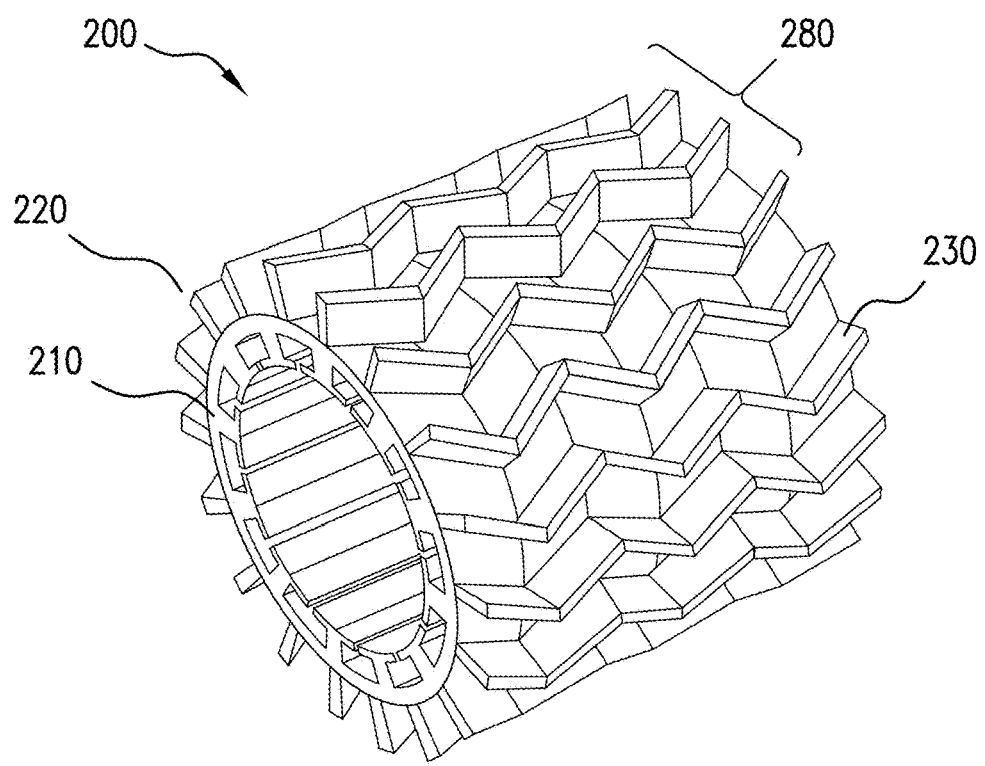
FIG. 3 illustrates additional features of a stator according to another embodiment.
Figure 4:
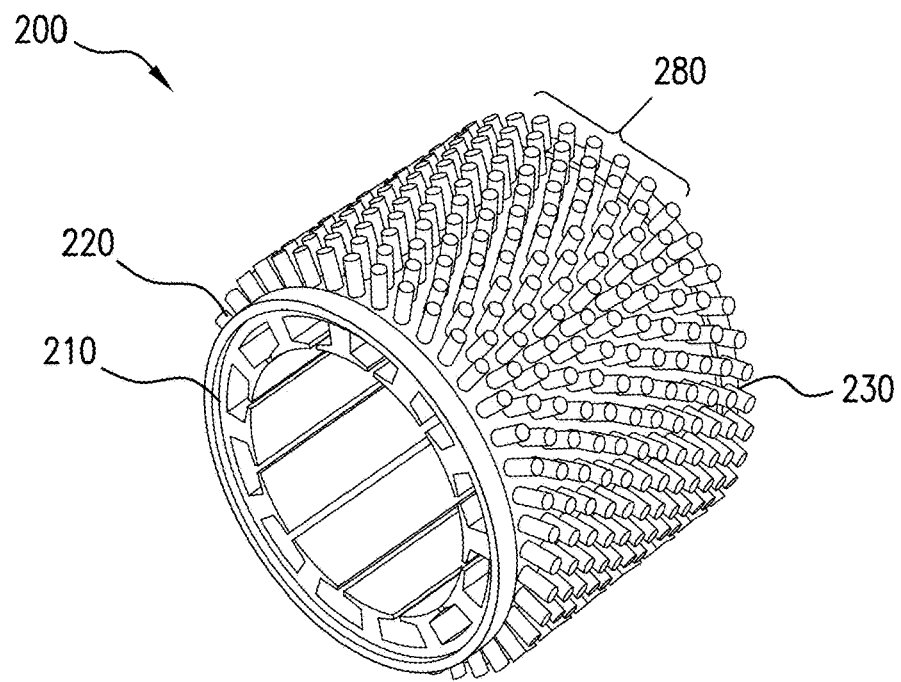
FIG. 4 illustrates additional features of a stator according to another embodiment.
Figure 5:
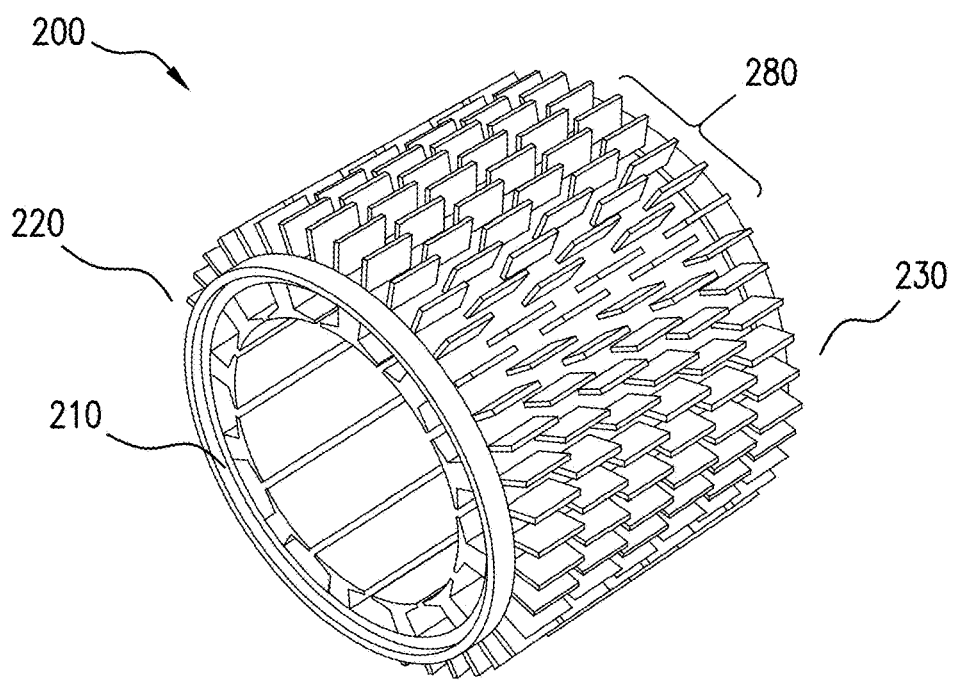
FIG. 5 illustrates additional features of a stator according to another embodiment.

Turning to FIGS. 2-3, the plurality of cooling features 280 may be one or more of (i) a plurality of discrete members (FIG. 2) and (ii) a plurality of continuous members (FIG. 3). As illustrated in FIG. 2, the plurality of cooling features 280 may be discrete members having an arcuate cross section. The cross section can be elliptical in one embodiment. Alternatively the cooling features may have a circular shape, a teardrop shape, an air-foil shape, and the like, which may be beneficial for enabling flow of a cooling medium thereover. As illustrated in FIG. 4, the plurality of cooling features 280 may be discrete members having an arcuate cross section that is circular. As illustrated in FIG. 5, the plurality of cooling features 280 may be discrete members having a cross section that is rectangular. In the embodiment illustrated in FIG. 3, the plurality of cooling features 280 may be continuous members forming a waveform, and more specifically a triangular waveform.

Figure 7:
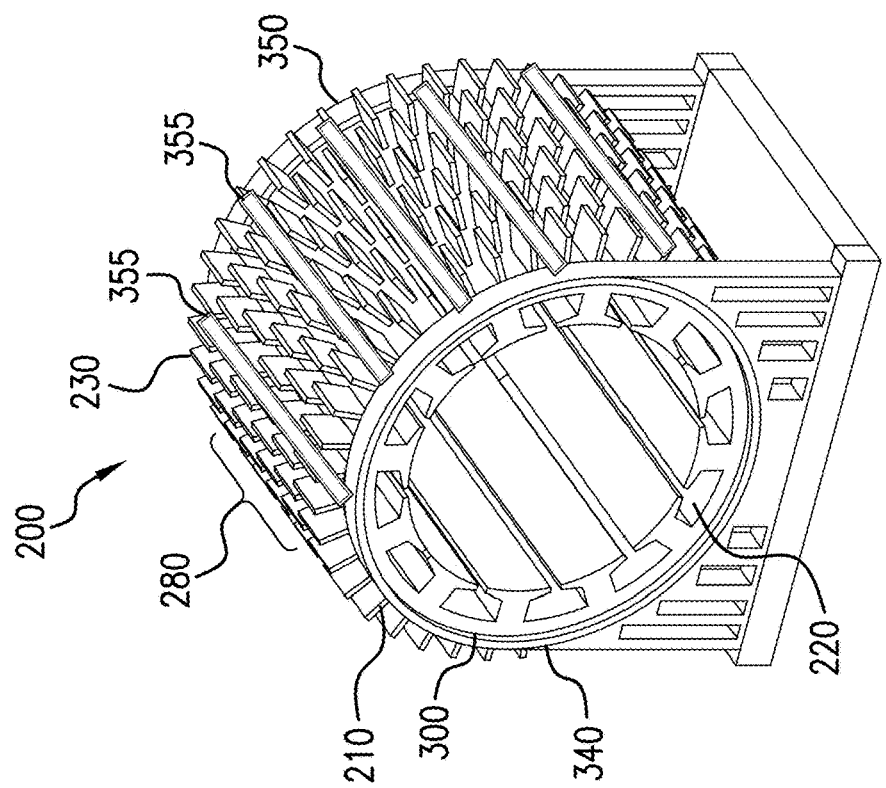
FIG. 7 illustrates features of a stator with a support frame according to another embodiment.
Figure 6:
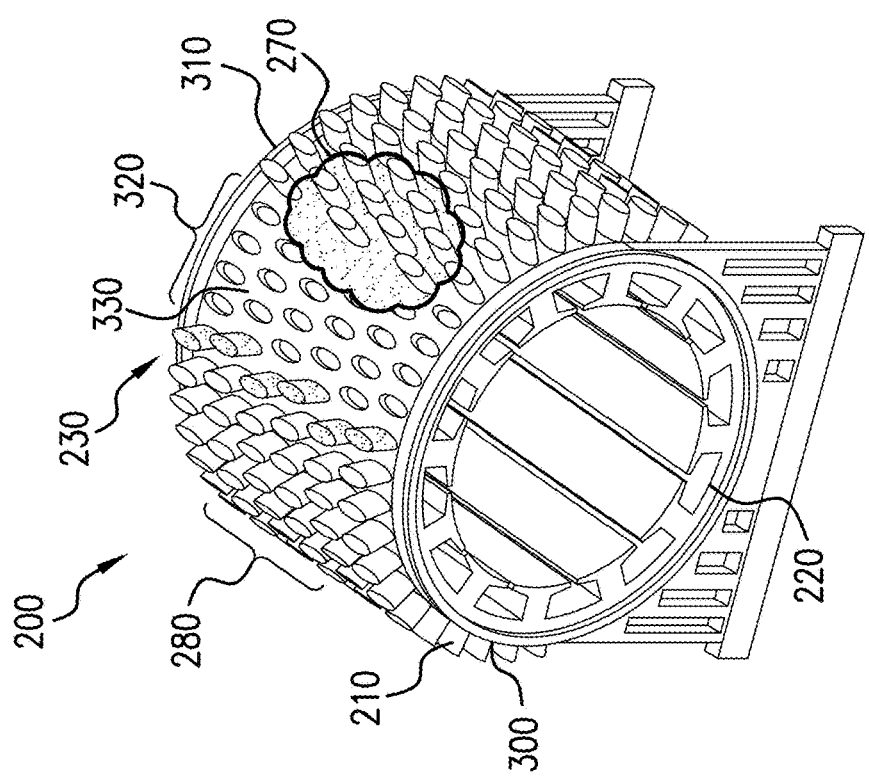
FIG. 6 illustrates features of a stator with a support frame according to an embodiment.

Turning to FIGS. 6 and 7, a support frame 300 is provided. The support frame 300 may support the opposing axial ends 220, 230 of the first member 210. As illustrated in FIG. 6, the support frame 300 may comprise a second cylindrical member 310 surrounding the first member 210 between the first plurality of axially opposing ends 220, 230 of the first member 210. The second member 310 may include a plurality of perforations 320, including a first perforation 330. The plurality of cooling features 280 may be fixedly attached to the stator 200, again illustrated schematically, through the respective plurality of perforations 320. In the embodiment with the base layer 270, the plurality of cooling features 280 may be fixedly attached to the base layer 270. In an embodiment where the cooling features 280 are additively manufactured, the cooling features 280 are printed directly on the base layer 270 through the openings of the perforated frame.

As illustrated in FIG. 7, the support frame 300 may comprise a plurality of axially opposing support rings, including a front end support ring 340 and a back end support ring 350. The front end support ring 340 supports the front end 220 of the first member 210. The back end support ring 350 supporting the back end 230 of the first member 210. The plurality of cooling features 280 is disposed axially between the plurality of support rings. In one embodiment one or more axially extending support bars 355 may be further provided for relatively improved torque transfer. The support bars 335 may be included with embodiments having end frame rings 340, 350 and/or a cylindrical frame 310 with perforated openings 320 (FIG. 6) whereupon fins 280 may be printed directly on the stator outer diameter side 250 for providing yet further improved torque transfer.

Figure 8:
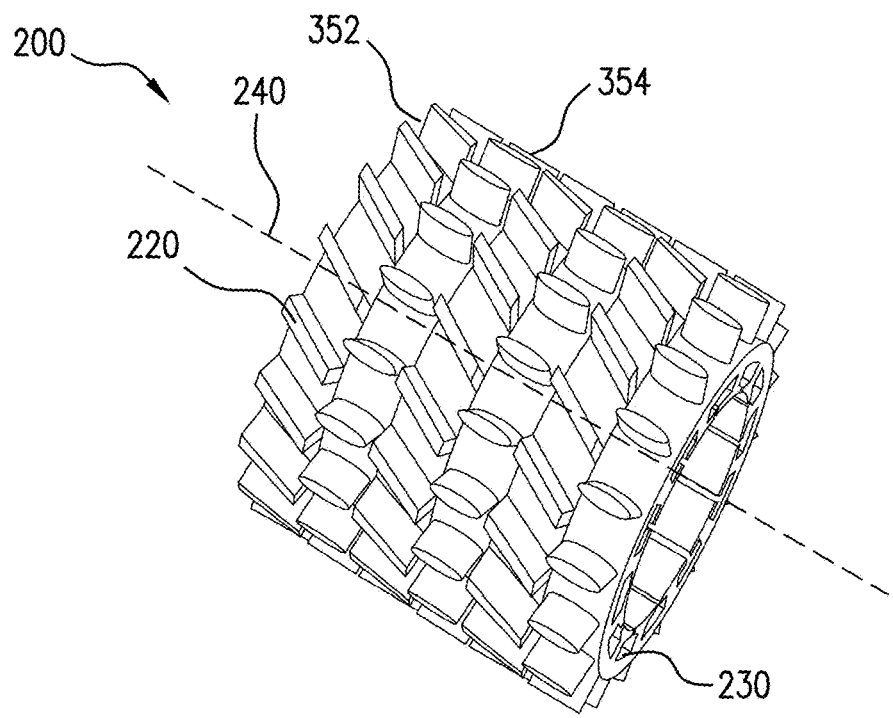
FIG. 8 illustrates additional features of a stator according to another embodiment.
Figure 9:
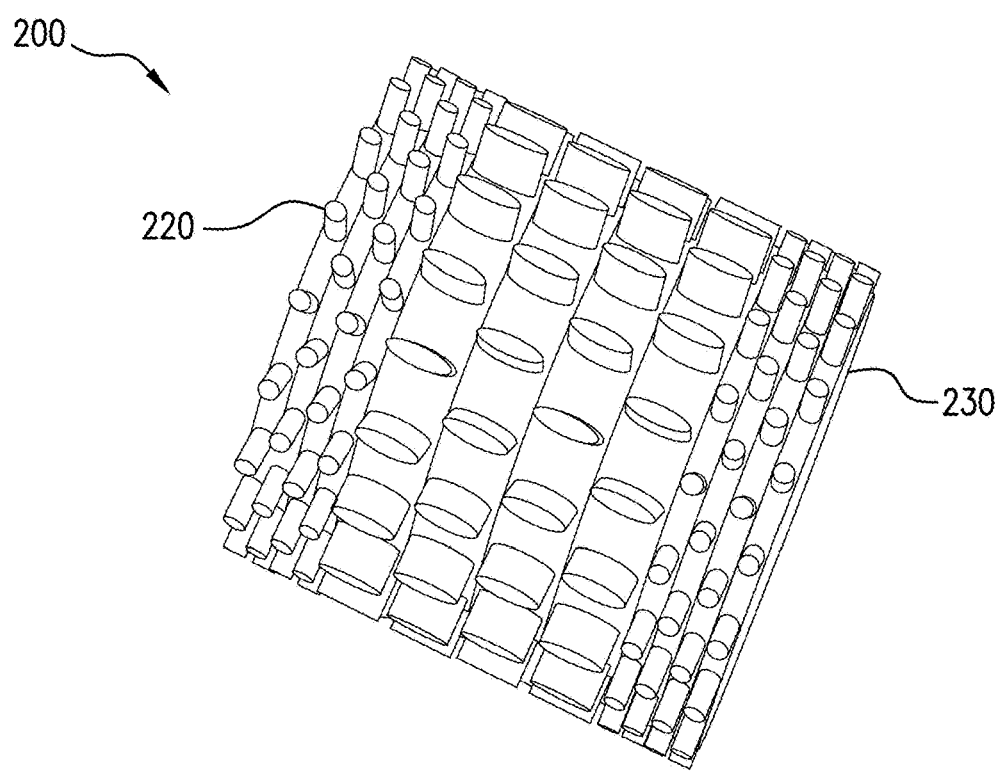
FIG. 9 illustrates additional features of a stator according to another embodiment.

Turning to FIGS. 8 and 9, additional embodiments of the stator 200 are illustrated in which the fin features are varied between opposing axial ends 220, 230 which may provide targeted cooling characteristics. In FIG. 8, one or more annular rings of fins 352 may have a parallelogram cross sectional shape, where the fins are at a skewed angle relative to the stator axis 240. Another one or more annular rings of fins 354 may have an oval shape, where the fins have a central axis that is parallel to the stator axis 240. In addition, the annular rings 352 and 354 may be intermixed along the stator axis 240. In FIG. 9, one or more annular rings of fins 356 proximate opposing axial ends 220, 230 may each have a circular cross sections while one or more axially centered annular rings of fins 358 may each have an oval shape. These configurations are not intended to be limiting. These configurations may provide localized focused cooling by having non-uniform cooling features/patterns of fins to provide variable cooling features.

Figure 10:
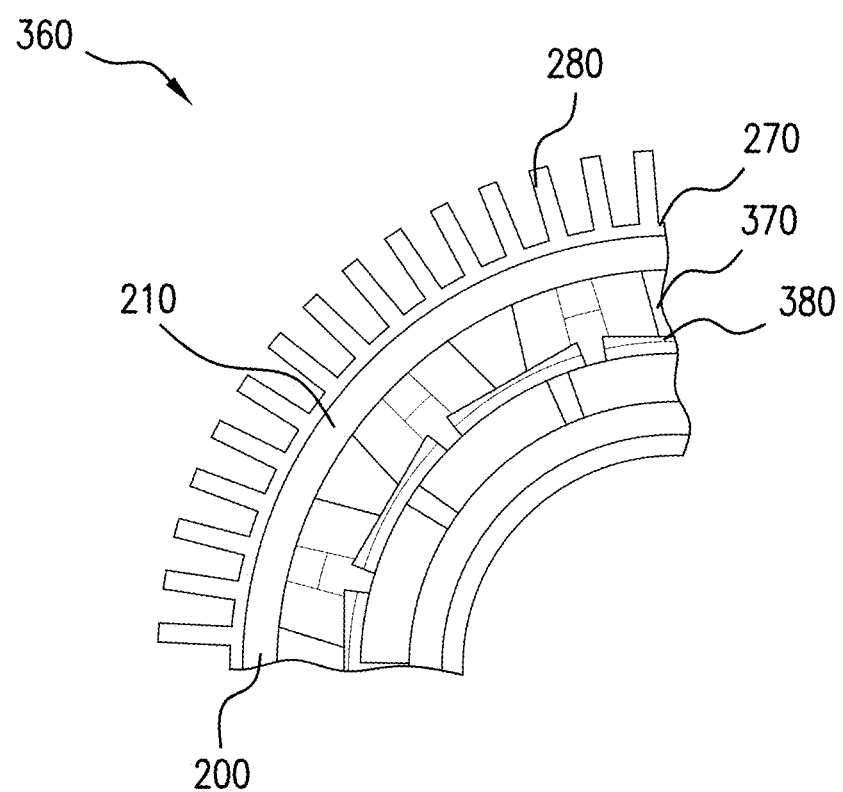
FIG. 10 illustrates features of a motor that includes a stator according to an embodiment.

As illustrated in FIG. 10, a motor 360 having the stator 200 with the above disclosed fins 280 may have copper windings 370 affixed to the first ID side 260 of the first member 210. A rotor 380 may be disposed within the stator 200. The fins 280 are built up over the base layer 270.

The above disclosed embodiments identify multiple additive manufacturing methods, such as cold spray, to deposit fins 280 onto a steel stator 200 of a motor 360 for improved cooling. That is, the disclosed embodiments provide cooling fins 280 architecture utilize additive manufacturing techniques, such as aluminum alloy cold spray, WAAM, direct laser deposition, to directly print fins 280 on a stator OD side 250. Cooling fins 280 on external additively manufactured layers of the stator 200 may be configured in a pin (circular) fin and/or a plate (rectangular) fin geometry. By eliminating and/or minimizing a circular frame over the stator OD side 250, the thermal contact resistance may be reduced between heat sources, for example the stator, the coil (windings), and the fins 280. This may result in a relatively enhanced cooling performance. That is, thermal contact resistance measurements, with the use of WAAM and cold spray layering, may be relatively reduced.

Figure 11:
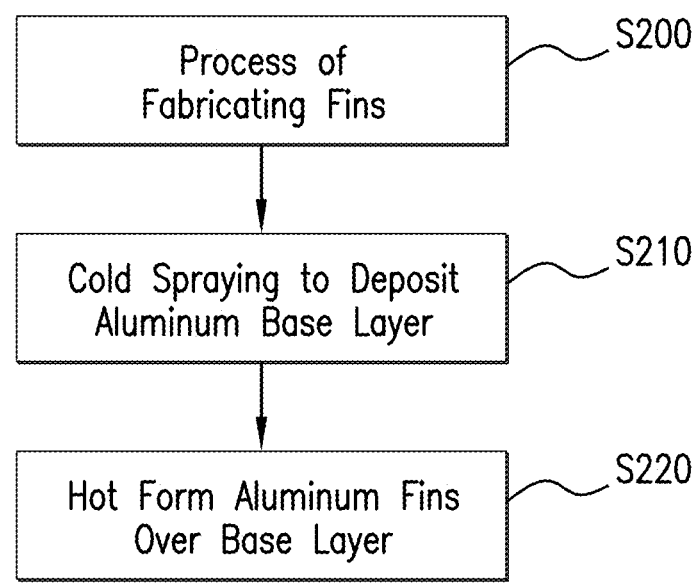
FIG. 11 illustrates a process of manufacturing a stator according to an embodiment.

Turning to FIG. 11, the process S200 of fabricating the fins 280 on the stator 200 may include step S210 of cold spraying to deposit the aluminum base layer 270. A bonding mechanism for cold spray may be a solid state that avoids issues of melt fusion of aluminum onto steel, as the melt fusion may create brittle intermetallics and residual stresses that weaken the interface. In addition, at step S220 a melt-based process (wire arc additive manufacturing (WAAM) or directed energy deposition) may be utilized to create walls or fins 280. For this second part of the process, a melt pool may be kept shallow to interact with the only the cold spray layer thus avoiding any interaction with the steel.

In one embodiment the fins 280 may be made using an additive technique or via a conventional sheet metal bending, followed by brazing, for friction welding. In such an embodiment, an aluminum base layer 310 is deposited first by an additive method such as cold spray and then a preformed sleeve of fins 280 is bonded onto the base layer 310.

One or more benefits of the above disclosed embodiments may be an improved thermal management of motors 360. This benefit may be enabled by additive deposition of aluminum cooling features using two methods in tandem. That is, there may be an improved heat transfer from a reduction in thermal resistance and an elimination of thermal contacts between the stator 200 and frame 300. In addition, an improved convective heat transfer may be possible from a relatively efficient fin structure. In addition, an alternate torque transfer mechanism may be provided by the above process as well as a weight savings, which may be obtained by removing material from the frame 300. The embodiments may also provide an ability to operate a motor 360 at a relatively higher current density, which may provide an increased power density.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A motor comprising:
   a stator that includes:
   a first member having a first plurality of axially opposing ends including a first front end and a first back end mutually spaced along a first stator center axis, a first outer diameter (OD) side and a first inner diameter (ID) side,
   wherein the first member comprises laminated steel;
   a base layer is disposed directly against the first member and a plurality of cooling features disposed against the OD side of the first member via the base layer, the plurality of cooling features and the base layer being a same material that is different from the first member,
   wherein the plurality of cooling features span between the first plurality of axially opposing ends of the first member, and
   wherein the base layer is configured to reduce an interface contact resistance between the first member and the plurality of cooling features;
   wherein:
   the plurality of cooling features is a plurality of discrete fins having a cross section that is one or more of rectangular, oval, arcuate, and circular,
   the plurality of cooling features are disposed directly against and extend radially outwardly front the base layer;
   a support frame supports the first plurality of axially opposing ends of the first member,
   wherein;
   the support frame comprises a second member surrounding the first member between the first plurality of axially opposing ends,
   the second member is cylindrical and includes a plurality of discrete perforations,
   the plurality of cooling features is additively manufactured directly onto the stator through the respective plurality of discrete perforations, and
   wherein a shape of the plurality of discrete perforations defines the cross sectional of the respective cooling features; and
   copper windings are disposed on the first ID side of the first member.

2. The motor of claim 1 wherein
   the plurality of cooling features have a cross section that is one or more of a discrete elliptical cross section and a discrete circular cross section.

3. The motor of claim 1 wherein
   the support frame comprises a plurality of support rings, including a front end support ring supporting the first front end of the first member and a back end support ring supporting the first back end of the first member,
   the plurality of cooling features being disposed axially between the plurality of support rings.

4. The motor of claim 1 including a rotor disposed within the stator.

5. A method of configuring a motor, comprising:
   providing a stator that includes a first member,
   the first member comprising a first plurality of axially opposing ends including a first front end and a first back end, a first outer diameter (OD) side and a first inner diameter (ID) side,
   wherein the first member comprises steel;
   layering, by cold spraying deposition, a base layer directly against the first OD side of the first member, hot forming a plurality of cooling features against and extending radially outwardly from the first member via the base layer,
  wherein the plurality of cooling features spans between the first plurality of axially opposing ends of the first member; and
thereby
  wherein the base layer reduces an interface contact resistance between the first member and the plurality of cooling features; and
wherein;
  the plurality of cooling features is plurality of discrete fins having a cross section that is one or more of rectangular, oval, arcuate, and circular,
  the plurality of cooling features are disposed directly against and extend radially outwardly from the base layer;
providing a support frame supporting the first plurality of axially opposing ends of the first member,
wherein;
  the support frame comprises a second member surrounding the first member between the first plurality of axially opposing ends,
  the second member is cylindrical and includes a plurality of discrete perforation,
  the plurality of cooling features is additively manufactured directly onto the stator through the respective plurality of discrete perforations, and
  wherein a shape of the plurality of discrete perforations defines the cross sectional of the respective cooling features; and
  disposing copper windings on the first ID side of the first member.

6. The method of claim 5 wherein
the plurality of cooling features has a cross section that is one or more of a discrete elliptical cross section and a discrete circular cross section.

7. The method of claim 5, wherein
the support frame comprises a plurality of support rings, including a front end support ring supporting the first front end of the first member and a back end support ring supporting the first back end of the first member,
the plurality of cooling features being disposed axially between the plurality of support rings.

8. The method of claim 5 including disposing a rotor within the stator.

* * * * *